UNITED STATES PATENT OFFICE.

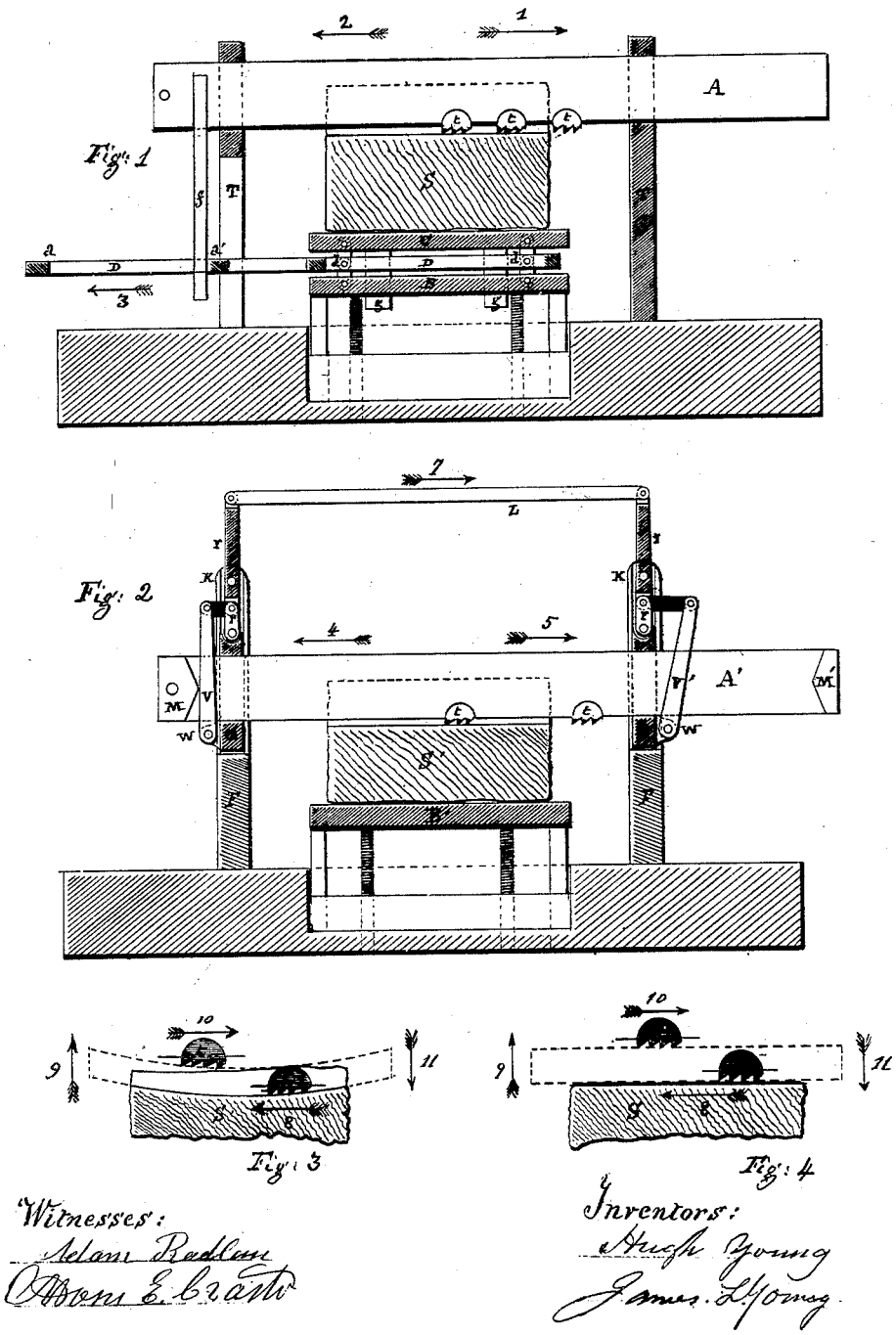

HUGH YOUNG, OF MIDDLETOWN, CONNECTICUT, AND JAMES L. YOUNG, OF NEW YORK, N. Y.

IMPROVEMENT IN STONE-CUTTING MACHINES.

Specification forming part of Letters Patent No. 108,424, dated October 18, 1870.

*To all whom it may concern:*

Be it known that we, HUGH YOUNG, of Middletown, in the county of Middlesex and State of Connecticut, and JAMES L. YOUNG, of the city of New York, in the county and State of New York, have invented certain Improvements in Stone-Cutting Machines, of which the following is a specification:

This invention relates to a stone-cutting machine in which diamonds or other hard stones are used as cutters or tools; and it consists in the mode of operating said cutters in relation to the stone to be cut, so that the diamonds will cut in one direction only, and that when the diamonds are moving in the opposite direction from the one in which they are intended to cut, they will be withdrawn away from the stone, and not be exposed to any blow, pressure, or friction applied to them or their setting from the back thereof.

In our previous patents we had it in contemplation that the diamonds should cut in both directions of the motion of the blade upon which they are mounted, and in our patent for a pendulum-tool we describe the advantages which are derived from a tool in which the diamonds are set so that their points of cutting or cutting-edges are turned toward the work to be done, and of relieving the said diamonds from any pressure, stroke, or contact with the stone to be cut in contrary direction to that in which the said diamonds are intended to work.

The distinct characteristic of our present invention is that the diamond cutters are brought into contact with the stone to be cut only when the guiding-blade carrying them is moving in one direction, and that the direction in which the cutters are intended to cut, and that, when the said blade is moving in the opposite direction to that in which the diamond cutters are intended to cut, then the cutters and guiding-blade are withdrawn from all contact with the stone to be cut, so that during the entire reverse motion the diamond cutters are entirely free from all contact, stroke, or pressure from behind, and all shifting of the débris back and forth within the cut is avoided.

Figures 1 and 2 are sectional elevations of our improved stone-cutting machine through the center thereof. Fig. 3 is an illustration of the motion of the cutters in a machine where the guiding-blade is hung from pendulous arms, and Fig. 4 is a similar illustration for a machine where the blade has a rectilinear motion.

A is a blade, guided in any suitable manner so as to have a go-and-come motion in the line of the cut to be made in the stone S. $t$ is the cutter, consisting of a diamond or cluster of diamonds, or of any other hard stones, set in the blade A, or in blocks fastened thereto, in any approved manner; but, as the intention is that said cutter $t$ will cut or plow into the stone while moving in one direction only, the diamonds may be set so as to present the points or cutting-edges of said diamonds to the work to be accomplished by them. T is the frame of the machine, which has to be built in a substantial manner, and of any approved pattern. B or B′ is a platform moving in suitable guides, and provided with any suitable feed arrangement to bring it nearer and nearer to the blade A or A′, either by a regular or by intermittent movement, according to the peculiar construction of the machine, or to the kind of stone to be cut thereon. C is a table, having suitable guides $g\ g$, arranged relatively to the platform B so as to allow of the table C being alternately forced away from and brought nearer to the platform B, for the purpose explained further. D is a bar, which is connected to knuckle-joints $d\ d$ in such a manner that the longitudinal motion of the said bar D will control the motions between the table C and platform B alluded to. $f$ is a finger or tappet fastened to the blade A, and playing in a slot, $a\ a'$, of the bar D, so that when the blade A arrives at the end of its motion in the direction of the arrow 1, the finger $f$ will engage the bar D at $a'$, and thereby elevate the table C, and bring the stone S against the cutter or cutters $t$. The blade A now moves in the direction of the arrow 2, the cutters $t$ making a cut or plowing a channel in the stone S until the end of the stroke, when the finger $f$, engaging the bar D at $a$, pushes it in the direction of the arrow 3, and, closing the knuckle-joints $d\ d$, brings the stone S away from the cutters $t$, so as to allow said cutters to move backward during the entire return stroke of the blade A, without touching the bottom of the channel or disturbing the débris therein.

It will be observed that in the above illustration the alternate bringing of the stone into contact with the cutters and the withdrawing the stone from such contact is a distinct movement, and made for a different purpose than the ordinary and necessary feed of the stone to the cutters $t$, whether regular or intermittent, and it is evident that the same object will be accomplished if the same alternate bringing into contact and withdrawal be produced by a corresponding alternate movement of the blade, the stone having no other motion than the one necessary to the feed thereof. Thus, in Fig. 2, A' is a blade mounted and guided so as to receive a go-and-come motion in the direction of the arrows 4 and 5, and carrying one or more cutters, $t$. G G are blocks in which slides the blade A. These blocks G G are mounted so as to be able to move up and down in the frame F. $r$ $r$ $r$ $r$ are knuckle-joints or links, suspending the blocks G to the frame F by the pins K. L is a bar connecting the knuckle-joints $r$ together. V V are levers, pivoted, at $w$, to the blocks G, and having, at their ends, the links $m$, connecting said levers V with the knuckle-joints $r$. M M' are stops, fastened to the blade A' in such a manner that when said blade arrives at either end of the stroke or motion one of the stops M will act upon and engage the lever V, so as to work the knuckle-joints $r$.

When the blade is moving in the direction of the arrow 4, the cutters $t$ are in action or plowing into the stone S'. At the end of this movement the stop M' reaches the lever V', the knuckle-joints $r$ are bent, (the bar L being thrown in the direction of the arrow 7,) the blocks G are raised, and, the blade A' being elevated with it, the cutters $t$ are withdrawn from the stone and thrown out of action thereon. The blade A' now moves in the direction of the arrow 5 until the stop M is brought in contact with the lever V, when, the knuckle-joints $r$ being straightened, the blocks G fall, and the cutters $t$ are again brought into position to act upon the stone S'.

The platform B' may have any suitable device to move it toward the blade A', so as to feed the stone to the cutters $t$ in a regular or intermittent manner.

According to the length of the stone to be cut, and to the relative length of the stroke of the machine, the blade or blades may have one or more cutters $t$, either so as to have one cutter plow its way right through the entire length of the stone, or have a number of cutters perform the same work by each cutting a portion of the length, care being taken that the several cutters are placed somewhat nearer to each other than the length of the stroke of the machine.

The whole machine may be set horizontally, as we have represented it in our drawings, or, preferably, at an inclination with the horizon. This setting of the machine in an inclined position has for its objects, first, to facilitate the water in carrying away the débris from the channel or cut in the stone S; and, secondly, the taking advantage of the weight of the blade or blades, and of the frame in which said blades are mounted, to assist the motive power in that motion or stroke of the machine where the cutters are doing their work.

We have described our blade A and A' as moving in slides. It can work equally well if mounted upon levers or hanging from links having a pendulous motion. The cut would in that case present the appearance of Fig. 3, in which, as well as in Fig. 4, the principle of our invention is illustrated in an abstract manner.

It makes no difference if it be the cutter which is moved alternately away from and toward the stone, as in Fig. 2, or the stone alternately moved away from and toward the cutter, as in Fig. 1. The result is the same, and the arrows 8, 9, 10, and 11, on Figs. 3 and 4, indicate in an exaggerated manner the essential principle of our invention.

We claim—

1. The table C, susceptible of being moved away from and toward the platform B, in combination with the blade A and the cutter or cutters $t$, operating substantially as and for the purpose set forth.

2. The blade A', mounted substantially in the manner described, so as to have, besides a go-and-come motion, a motion from and toward the stone to be cut, for the purpose specified.

3. The combination of the platform B with the table C and blade A, substantially in the manner and for the purpose specified.

4. The combination of the platform B' with the blade A', substantially in the manner and for the purpose specified.

5. The cutter or cutters $t$, mounted in such a manner in relation to the stone to be cut thereby that said cutters will have, besides a reciprocal motion in the line of the cut to be made in the stone, a positive motion away from and toward said stone, or that the stone itself will have a corresponding positive motion away from and toward the cutter or cutters, so as to operate substantially in the manner and for the purpose set forth.

HUGH YOUNG. [L. S.]
JAMES L. YOUNG. [L. S.]

Witnesses:
MOSES E. CRASTO,
ADAM RADLEIN.